(12) United States Patent
Burger

(10) Patent No.: US 10,736,719 B2
(45) Date of Patent: Aug. 11, 2020

(54) TOOTH REPLACEMENT FORMING DEVICE, AND METHOD FOR FORMING A TOOTH REPLACEMENT

(71) Applicant: Ivoclar Vivadent AG, Schaan (LI)

(72) Inventor: Goran Burger, Grabs (CH)

(73) Assignee: Ivoclar Vivadent AG, Schaan (LI)

( * ) Notice: Subject to any disclaimer, the term of this patent is extended or adjusted under 35 U.S.C. 154(b) by 340 days.

(21) Appl. No.: 15/526,376

(22) PCT Filed: Nov. 12, 2015

(86) PCT No.: PCT/EP2015/076456
§ 371 (c)(1),
(2) Date: May 12, 2017

(87) PCT Pub. No.: WO2016/075249
PCT Pub. Date: May 19, 2016

(65) Prior Publication Data
US 2017/0312059 A1 Nov. 2, 2017

(30) Foreign Application Priority Data
Nov. 14, 2014 (EP) .................................... 14193333

(51) Int. Cl.
*A61C 13/00* (2006.01)
*A61C 13/34* (2006.01)
(Continued)

(52) U.S. Cl.
CPC .......... *A61C 13/0006* (2013.01); *A61C 8/005* (2013.01); *A61C 8/0054* (2013.01);
(Continued)

(58) Field of Classification Search
CPC ..... A61C 13/0006; A61C 13/34; A61C 13/20; A61C 13/0004; A61C 8/0054;
(Continued)

(56) References Cited

U.S. PATENT DOCUMENTS 5,613,854 A * 3/1997 Sweatt ............... A61C 13/0003
433/218
2006/0106484 A1* 5/2006 Saliger ................ A61C 8/0048
700/182

(Continued)

FOREIGN PATENT DOCUMENTS

GB 239103 A * 9/1925 ......... A61C 13/1023
JP 2010119465 A 6/2010

*Primary Examiner* — Lee A Holly
(74) *Attorney, Agent, or Firm* — Ann M. Knab; Thad McMurray

(57) ABSTRACT

Disclosed is a tooth replacement forming device (10) comprising an abutment on or to which a dental structure made of dental material, especially ceramics, can be fastened. The abutment is mounted on the implant using a detachable connection, in particular a screw connection, the abutment being provided with an implant connection, a collar, and a tubular portion to be connected to the dental structure. The disclosed device (10) is characterized in that a surrounding auxiliary element made of a residue-free material is arranged in such a way as to rest against the tubular portion.

20 Claims, 4 Drawing Sheets

(51) Int. Cl.
*A61C 8/00* (2006.01)
*A61C 13/20* (2006.01)

(52) U.S. Cl.
CPC ........ *A61C 8/0066* (2013.01); *A61C 13/0004* (2013.01); *A61C 13/20* (2013.01); *A61C 13/34* (2013.01); *A61C 8/0016* (2013.01); *A61C 2008/0084* (2013.01)

(58) Field of Classification Search
CPC ..... A61C 8/005; A61C 8/0066; A61C 8/0016; A61C 2008/0084
See application file for complete search history.

(56) References Cited

U.S. PATENT DOCUMENTS

| | | | |
|---|---|---|---|
| 2008/0293017 A1* | 11/2008 | Lussi | A61C 8/0012 |
| | | | 433/196 |
| 2009/0317769 A1* | 12/2009 | Urdaneta | A61C 8/005 |
| | | | 433/202.1 |
| 2012/0183925 A1 | 7/2012 | Gittleman | |
| 2012/0214130 A1 | 8/2012 | Krivoruk | |
| 2014/0205969 A1* | 7/2014 | Marlin | A61C 8/008 |
| | | | 433/173 |
| 2017/0049539 A1* | 2/2017 | Jacoby | A61C 8/0006 |

* cited by examiner

TOOTH REPLACEMENT FORMING DEVICE, AND METHOD FOR FORMING A TOOTH REPLACEMENT

CROSS-REFERENCE TO RELATED APPLICATIONS

This application is a National Stage application of International patent application PCT/EP2015/076456 filed on Nov. 12, 2015, which claims priority to European patent application No. 14193333.3 filed on Nov. 14, 2014, the disclosures of which are incorporated herein by reference in their entirety.

TECHNICAL FIELD

The invention relates to a tooth replacement production device for producing an abutment of a tooth replacment, and to a method for producing a tooth replacement having an abutment.

BACKGROUND OF THE INVENTION

In many cases, tooth replacements are attached in the mouth of a patient with the aid of an implant. In these cases, the implant is typically provided with a so-called abutment after it has been inserted, said abutment being connected with the implant positively, for instance by configuring the surfaces of implant and abutment which face one another non-circularly. Then, the attachment itself is effected by means of an abutment screw which passes through the abutment. For this purpose, an upper area of the abutment is configured as a tubular portion, whose internal diameter is sufficient for receiving the abutment screw. The abutment screw is supported slightly below this tubular portion on a supporting area which is slightly conical in most cases whose internal diameter is smaller than the diameter of the head of the abutment screw but through which the shank and the thread of the abutment screw fit. Then, the implant comprises an internal thread for threaded engagement with the thread of the abutment screw, in a way known per se.

Subsequent to the attachment of the abutment to the implant a dental structure is attached on the abutment. For this purpose, the tubular portion or the upper area of the abutment is slightly conical on the outside in most cases and fits positively into a corresponding recess in the dental structure.

Solutions of this type have been used for approximately 30 years; by way of example, it is referred to DE 32 41 963 C1 or GB 2 119 258 A, in this respect.

However, especially with the solution according to the latter reference there is the problem that the rotary position of the dental structure relative to the implant is not determined or not clearly determined. In this connection, a better and slightly more recent solution may be taken from U.S. Pat. No. 5,782,918 A1 which shows an anti-rotation mechanism in the form of a flattening of the tubular portion of the abutment and in this respect realizes an anti-rotation mechanism between implant and dental structure.

In this solution, only one single size or height of the abutment is provided which is selected to have such a small size that even more compact dental structures completely cover the tubular portion.

In order to improve the handling and in particular also the process sequence in the secure attachment of the suprastructure on the abutment various auxiliary elements have already been suggested.

In this respect, it has been suggested to push a type of hose having a wall thickness of, for instance, 0.5 mm, onto the tubular portion of the abutment without further ado, in order to ensure that a sufficient adhesive gap is provided later on. However, due to the elasticity of the hose no uniform—and at the same time low—thickness of the adhesive gap can be realized.

Furthermore, pre-fabricated auxiliary elements have also been suggested in which an anti-rotation mechanism is ensured by means of a projection pointing to the outside. However, with this type of anti-rotation protection there are problems in the realization of bridges which are basically self-adjusting in terms of the angular position such that an anti-rotation protection of this type is disturbing.

A further problem are the undercuts and retention grooves which are provided in this respect and which generate comparatively large adhesive joints. In this way, adhesiveness is reduced comparatively strongly in these areas, especially as this may lead in other areas to material thicknesses being fallen below, particularly in the marginal area of the restoration, on the other hand.

SUMMARY OF THE INVENTION

In contrast, the invention is based on the task of providing a tooth replacement production device according to the preamble of claim 1 and a method of producing a tooth replacement according to the preamble of claim 17, which can be used better and universally, wherein the restoration result particularly with regard to adhesion on the abutment is also improved.

This task is inventively solved by the attached claims. Advantageous embodiments may be taken from the sub-claims.

According to the invention, it is particularly favorable that the abutment is provided with an external radius at its tubular portion which is not exceeded at any position. Thus, no anti-rotation tongue protrudes into the auxiliary element such that it does not experience weakening at this position either. Rather, it is provided to provide the tubular portion with a groove parallel to the longitudinal axis on the outside as an anti-rotation element and to accordingly provide the auxiliary element with an anti-rotation tongue which is provided particularly optionally and which matches the groove.

When this tongue is omitted, any desired rotational position may be taken for providing a bridge as a dental restoration, and the desired automatic angle adjustment, as arises with bridges, is ensured. It is also possible to remove the pre-fabricated anti-rotation tongue manually to achieve this effect.

Thus, according to the invention it is also favorable that the wall thickness of the auxiliary element is uniform and particularly not fallen below at any position such that it is not weakened. For instance, a wall thickness of 150 mm to 250 mm can be predetermined, and the auxiliary element can abut closely on the tubular portion in a fit free from play—optionally with an industrially pre-fabricated, for instance, blast-cleaned surface. The wall thickness of the auxiliary element can also amount to primarily between 100 mm and 350 mm, preferably about 200 mm, in any case except for the areas in which an anti-rotation mechanism is provided.

The auxiliary element is pre-fabricated and accordingly comprises a preconditioned surface with a predefined roughness, particularly both on the radial inside, that is to say towards the abutment, and on the radial outside.

Preferably, the auxiliary element has a greater roughness on its radial external surface than on its radial internal surface. The larger the roughness, the smaller the accuracy of fit. This holds true both on the inside, that is to say towards the abutment, and on the outside, that is to say towards the suprastructure. This roughness setting offers the advantage for the dental technician that the auxiliary element does not have to be finished afterwards any longer.

The size dimensions of the auxiliary element and the abutment are selected such that the auxiliary element can be pushed onto the abutment, particularly onto its tubular portion, in a fit free from play.

As it is configured of a material which can be removed without leaving any residues and in particular which can be burnt out, the adhesive joint between the suprastructure or the dental structure of the restoration and the abutment can be ensured in the desired quality with an accordingly uniform wall thickness. As a material, a resin set to be hard or a polyacrylic material come into question, and the industrially preconditioned external surface of the auxiliary element also allows for a wax model, if necessary, and a secure connection of the wax model which is desirable optionally.

According to the invention, a method for producing a tooth replacement is provided, said tooth replacement being produced using an abutment having a collar and a tubular portion which is intended to be connected with a dental structure of the tooth replacement. An auxiliary element is attached to, in particular pushed onto, the tubular portion. The auxiliary element is used as a base for the internal shape of the dental structure and is removed without leaving any residues after its use, in particular by heat exposure.

Preferably, the adhesive gap or adhesive joint comprises a uniform thickness. However, in the area of the collar of the abutment it is preferred that the adhesive gap is reduced; this increases the accuracy of fit.

When realizing an adhesive-receiving groove, excess adhesive is favorably displaced and received therein. When no adhesive-receiving groove of this type is provided, excess adhesive is displaced to the top towards the tubular portion facing away from the collar.

In this respect, the realization of an adhesive-receiving groove is not necessarily required and for reasons of an improved handling it is favorable if such a groove is not provided.

In a modified embodiment it is provided that the abutment comprises an adhesive-receiving groove at a transition between its tubular portion and a circumferential collar, said adhesive-receiving groove being configured circumferentially in particular adjacent to the collar, and that the auxiliary element comprises at least one projection, in particular a circumferential projection, which is intended to engage this groove.

In a modified embodiment it is provided that the adhesive bonding and modeling aid comprises a gripping handle which extends above the tubular portion when the adhesive bonding and modeling aid is inserted into the tubular portion.

In a modified embodiment it is provided that the adhesive bonding and modeling aid comprises a predetermined breaking point which extends particularly just above the tubular portion of the abutment when the adhesive bonding and modeling aid is inserted.

Preferably, the auxiliary element can be shortened to predefined heights. For this purpose, an initial height is provided, and favorably marks are provided to shorten the auxiliary element to two further heights, wherein the shortening process takes place particularly preferably using a tool which is suitable for this purpose. In this respect, the auxiliary element may be adjusted to abutments which vary in height or are classifiable.

Preferably, the auxiliary element comprises substantially the same wall thickness over its entire height. Thus, in the area of the tubular portion of the abutment it extends in exact adjustment with the length of this tubular portion to the collar of the abutment towards the bottom. At the position at which the tubular portion of the abutment ends at a front face an inner shoulder of the auxiliary element is configured, and the internal and external diameter of the auxiliary element recedes from this position while maintaining the wall thickness. The length of the auxiliary element above the tubular portion substantially corresponds to the length of the auxiliary element which abuts on the abutment.

Preferably, the inner side of this upper portion of the auxiliary element extends flush with the tubular portion of the abutment on the inside. Accordingly, the tube-shaped portion of the auxiliary element higher up has a smaller external diameter than the tube-shaped holder portion of the auxiliary element in which the tubular portion of the abutment is also positioned.

When the abutment comprises an adhesive-receiving groove at the transition between the tubular portion and the collar, it is preferable that the auxiliary element engages this groove, and in this respect comprises a respective projection which is directed towards the bottom/the inside for engaging this groove.

In a preferred embodiment it is provided that the auxiliary element comprises a height stop which, on the one hand, enables precise orientation, for instance by the height stop resting on the collar of the abutment, and, on the other hand, enables predefined height dimensions for the tubular portion.

BRIEF DESCRIPTION OF THE DRAWINGS

Further advantages, details and features may be taken from the following description of two exemplary embodiments of the invention in conjunction with the drawings, in which.

DETAILED DESCRIPTION OF THE INVENTION

Figure 1:
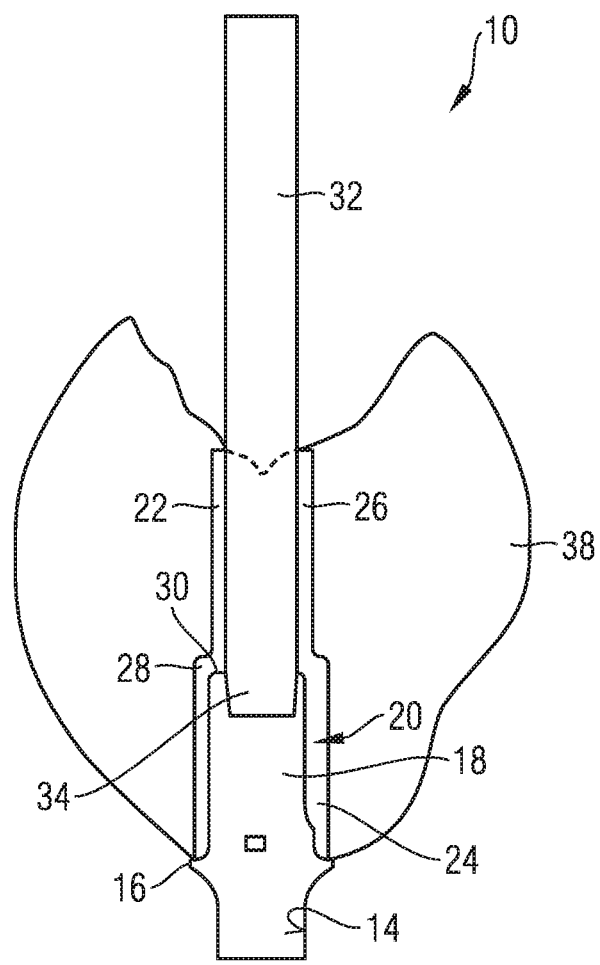
FIG. 1 shows a schematic illustration of a tooth replacement production device by illustrating the dental structure made of dental material, the auxiliary element and the abutment, as well as an adhesive bonding and modeling aid.

The tooth replacement production device 10 illustrated in FIG. 1 comprises a dental structure 12 as a suprastructure. This suprastructure is produced with the aid of CAD, consists preferably of ceramic and is mounted on an abutment 14 which is screwed onto an implant (not illustrated) in a way known per se. Even if an individual crown is illustrated herein, it is to be understood that a dental bridge can also be realized equivalently.

The abutment comprises a collar 16 and a tubular portion 18. The tubular portion 18 extends with a constant wall thickness in a way known per se. At at least one position it comprises a groove 20 to provide for an anti-rotation mechanism. In FIG. 1 this is illustrated by the lower wall thickness of the tubular portion 18 thereat.

According to the invention, an auxiliary element 22 is provided which extends over the entire tubular portion 18 and beyond with a constant wall thickness. The auxiliary element 22 consists of a material which can be removed without leaving any residues, such as a polymer, and comprises an industrially preconditioned surface.

The auxiliary element 22 is removed without leaving any residues during the thermal treatment for the production of the dental restoration part, that is to say during the pre-heating process of a muffle in a pre-heating furnace, when the dental restoration part is produced in a common press process. Its wall thickness determines the thickness of an adhesive gap for bonding a suprastructure onto the abutment. The wall thickness of the auxiliary element 22—and thus the adhesive gap—amounts to 0.01 mm and 0.5 mm, preferably less than 0.05 mm, and may be configured uniformly over its extension, but also changing over its extension, if necessary.

The auxiliary element 22 consists of a tube-shaped holder portion 24 and a tubular portion 26 having a smaller diameter by way of contrast, but having the same wall thickness. At the transition between the holder portion 24 and the tubular portion 26 an inner shoulder 28 is provided whose configuration fits a front face 30 of the tubular portion of the abutment 14.

The auxiliary element 22 is self-retaining on the tubular portion such that it adheres to it non-positively and/or positively, wherein the holding force amounts to preferably less than 10 kN and more than 50N.

The tubular portion 18 of the abutment 14 further comprises a number of recesses, in particular grooves 20, as anti-rotation mechanisms, which are particularly engaged with projections of the auxiliary element 22 which match these grooves positively and which are also referred to as tongues. The number of projections of the auxiliary element 22 is smaller than or equal to the number of recesses 20 of the tubular portion 18.

As is also apparent from FIG. 1, an adhesive bonding and modeling aid is provided which is inserted into the tubular portion 26 and partially into the tubular portion 18. It ends with a slight cone 34 and seals tightly against the tubular portion 18 thereat. The adhesive bonding and modeling aid ensures a tight sealing of the inner space of the abutment 14 such that no material can enter the abutment unintentionally which would impair the access towards the implant screw.

Due to its cone 34, the adhesive bonding and modeling aid 32 is positioned securely in the abutment, but it can be removed if necessary, as it extends considerably beyond the tubular portion 26 to the top.

Preferably, the adhesive bonding and modeling aid 32 is produced separately from the auxiliary element 22. However, an integral realization is also possible.

Figure 2:
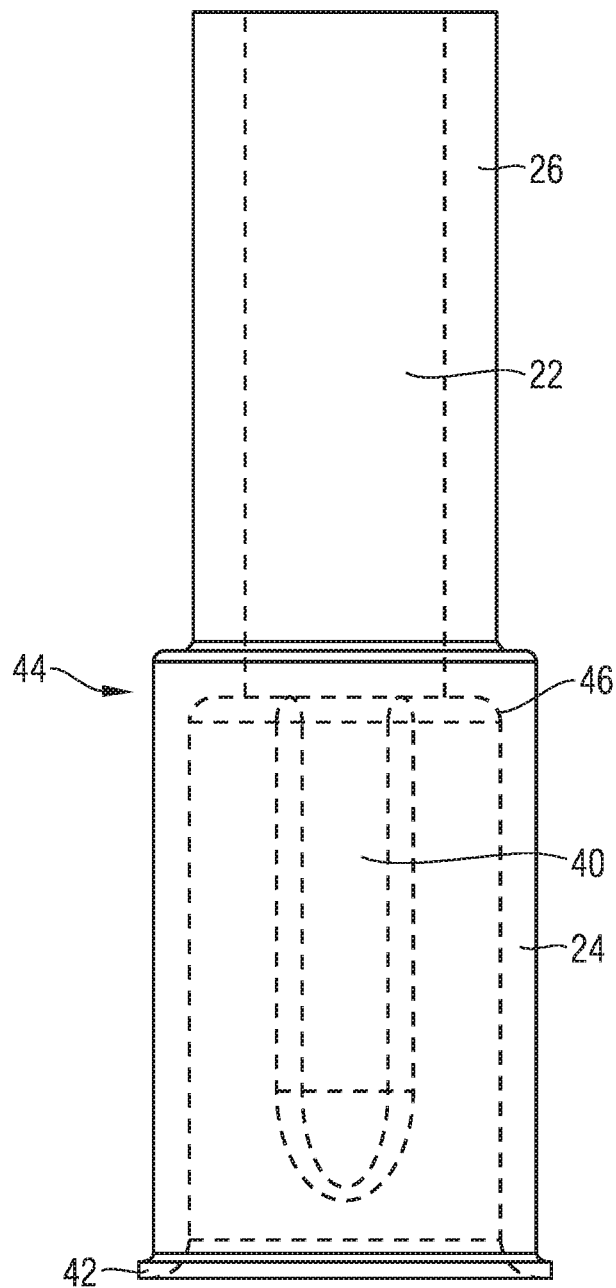
FIG. 2 shows the auxiliary element according to FIG. 1 in another illustration.

It is apparent from FIG. 2 how the auxiliary element 22 may be configured in detail. Here, as well as in the further claims, the same reference numerals indicate the same parts. At its holder portion 24 the auxiliary element 22 comprises a tongue 40 which projects radially towards the inside and which is configured to have a convex shape and which fits the groove 20 at the tubular portion 18 of the abutment 14. The holder portion 24 ends in a flange 42 which projects radially towards the outside and comprises an inner shape which fits a respective radius between the collar 16 and the tubular portion 18 of the abutment 14. Preferably, the flange 42 extends beyond the collar 16 by a small degree, for instance 10 mm, in order to improve the attachment.

Preferably, the material thickness or wall thickness of the auxiliary element 22 is increased considerably, particularly approximately doubled, at the position(s) at which an anti-rotation mechanism is provided, compared to the wall thickness of the remaining auxiliary element 22.

In the transition area 44 between the holder portion and the tubular portion 26 the auxiliary element 22 comprises an internal radius 46 which fits the respective configuration at the front face 30 of the abutment. Thus, the auxiliary element abuts on the entire surface of the abutment 14 with an ideally uniformly small wall thickness.

Figure 3:
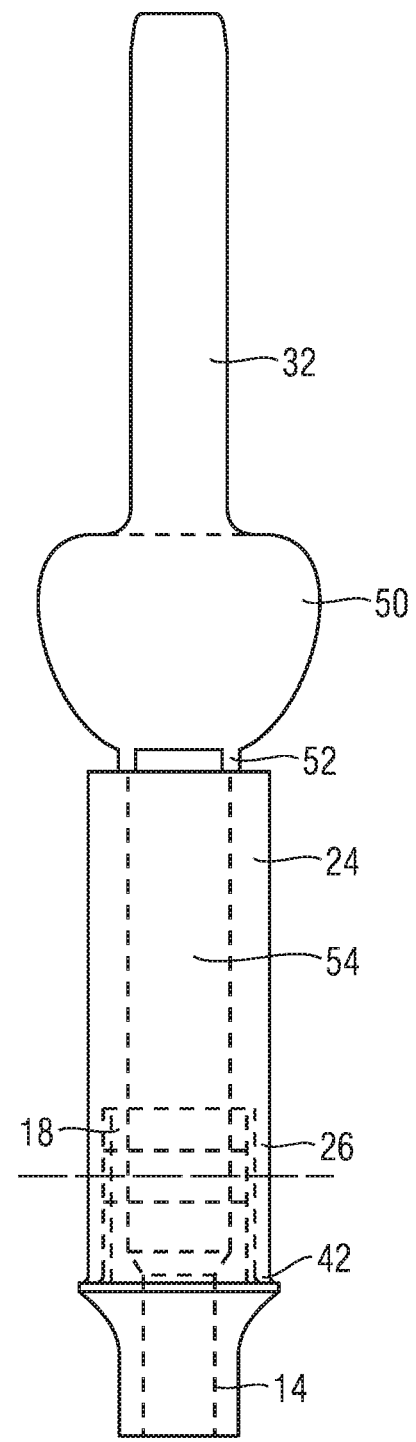
FIG. 3 shows a further embodiment of an inventive tooth replacement production device.

It is apparent from FIG. 3 how the adhesive bonding and modeling aid 32 may extend into the abutment 14. Here, the adhesive bonding and modeling aid 32 comprises a gripping handle 50 which is configured substantially in the shape of a leaf in the exemplary embodiment illustrated. Just below the gripping handle 50 a predetermined breaking point 52 is provided at which the adhesive bonding and modeling aid may be broken away, if necessary. Then, its insertion portion 54 completely fills the tubular portion 18. As the adhesive bonding and modeling aid 32 also consists of material which can be removed without leaving any residues it can be removed together with the removal of the auxiliary element 22 which does not leave any residues.

In any case, the adhesive bonding and modeling aid 32 seals the tubular portion 18 securely against penetrating foreign matter such that the access to the implant screw is always ensured.

While, according to the invention, the use of suprastructures made of ceramic, in particular glass ceramic, has priority, it is possible in a modified embodiment to use the auxiliary element 22 and/or the adhesive bonding and modeling aid 32 with restorations made of plastic or composite material.

Preferably, the auxiliary element comprises a reference surface and/or a scannable mark which and whose position in space may be detected by a scanning device which particularly forms part of the CAD/CAM device. In this way, for instance, an auxiliary element identified by the scanning device—whose wall thickness is thus known—may be used for designing the adhesive gap by means of CAM. It is equally possible that the CAD/CAM device predetermines an auxiliary element identifiable by means of the marking based on the adhesive gap determined by the CAD/CAM device, wherein scanning the mark allows to check if the correct auxiliary element is used.

The reference surfaces and/or marks are not only useful for designing the adhesive gap but they also particularly serve as a reference surface for the position of the abutment and/or as an anti-rotation protection in connection with the patient situation. The larger the reference surface, the better and more accurate is the scan result. In order to increase the size of the reference surface the auxiliary element and/or the adhesive bonding aid may be provided in one piece and/or in two pieces.

Figure 4:
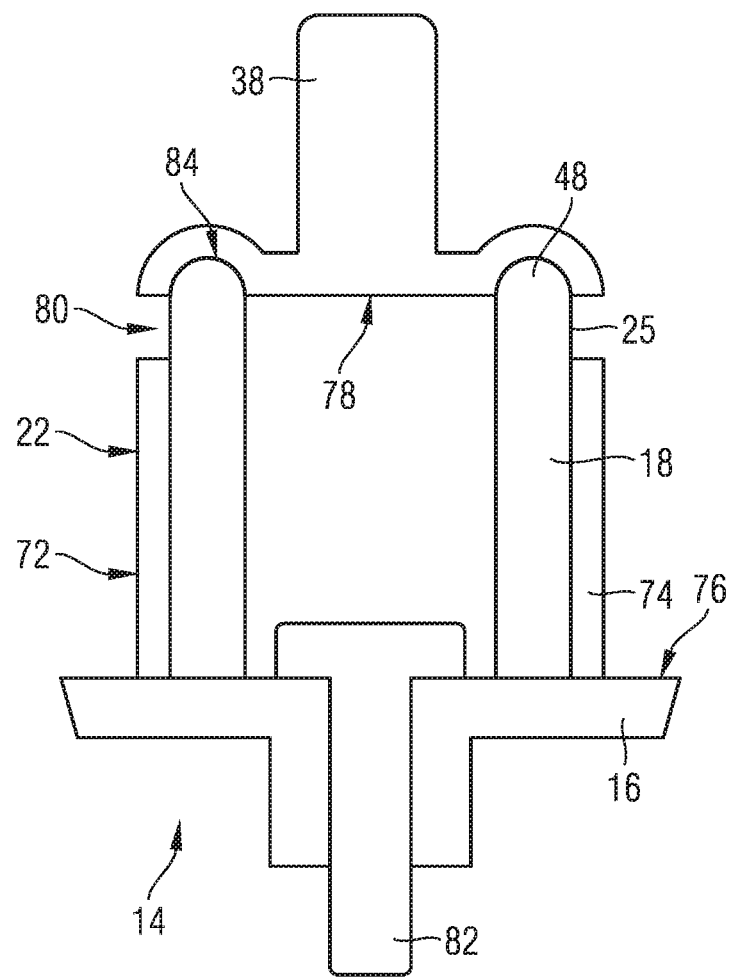
FIG. 4 shows a further embodiment of an inventive tooth replacement production device.

In the embodiment according to FIG. 4 it is provided to provide for the shortening of the tubular portion 18 of the abutment 14 by means of an inventive auxiliary element 22. The basic cross-sectional shape of the auxiliary element 22 is configured similar to an annular bit. It comprises a shank 38 whose external diameter is suitable to be driven by any desired mechanical tool available in the dental practice. For this purpose, the diameter of the shank amounts to for instance 2.35 mm or 3 mm.

The bell-shaped element 72 of the auxiliary element 22 comprises a cylindrical portion or a sleeve 74 whose internal diameter fits the external surface 25 of the tubular portion 18 of the abutment 14 in a minimum clearance fit. The cylindrical portion 74 extends at the bottom up to the bearing surface 76 of the collar 16 which serves as a dimensioning reference. The sleeve 74 is made of a material which can be removed without leaving any residues, and in this embodiment the auxiliary element 22 is made up of two parts.

The auxiliary element 22 illustrated herein is intended to shorten the abutment 14 to a predetermined height. For this purpose, at the outer areas of its front face 78 it comprises a fillet 48 which is provided with teeth. Thereat, when turning the auxiliary element 22 via the shank 38, the abutment 14 is shortened in a machining process, for as long as the cylindrical portion 74 contacts the bearing surface 76. For the milling operation, the front face 78 may comprise staggered teeth, for a grinding operation it can be equipped with diamonds.

As can be seen from FIG. 4 chip removal recesses 80 are distributed evenly around the circumference of the auxiliary element 22, namely just under the front face 78 at the cylindrical portion 74.

As can also be seen from FIG. 4 an implant screw 82 extends through the abutment 10 towards the bottom; it serves to be anchored in the associated implant in a way known per se.

It is to be understood that for other desired heights of the tubular portion 18 correspondingly sized auxiliary elements 22 are provided, respectively. Their configuration at the fillet 48 with an internal radius ensures that an external radius 84 is maintained even if the tubular portion 18 is shortened.

Surprisingly, by means of this external radius 84 the durability of the suprastructure is improved considerably according to the invention; apparently, the external radius 84 greatly homogenizes the maximum local introduction of forces into the suprastructure.

It is provided that the auxiliary element 22 comprises at least one height stop which is intended to bear against a front face 70 of the tubular portion 18 at an implant screw and/or the collar 16, and that the height of the tubular portion 18 may be determined using the auxiliary element 22 and/or defined by selecting a suitable abutment 14 or shortening the tubular portion 18.

The invention claimed is:

1. A tooth replacement production device for producing a tooth replacement, said tooth replacement being produced using an abutment (14) of a tooth replacement, said abutment (14) comprising an implant connection, a collar (16) and a tubular portion (18) which is intended to be connected with a dental structure (12) of the tooth replacement,
    wherein an auxiliary element (22) abuts on the tubular portion (18) and surrounds the tubular portion,
    wherein the auxiliary element (22) is configured of a material which can be removed without leaving any residues,
    wherein the auxiliary element (22) comprises an anti-rotation projection which extends in an axially parallel manner protruding radially towards the inside and which fits into at least one groove (20) of the tubular portion (18) of the abutment (14) to provide for an anti-rotation mechanism.

2. The tooth replacement production device as claimed in claim 1,
    wherein the anti-rotation projection comprises a number of projections,
    wherein the tubular portion (18) of the abutment (14) comprises a number of recesses, which are engaged with the number of projections of the auxiliary element (22).

3. The tooth replacement production device as claimed in claim 2,
    wherein the number of recesses are in the form of grooves (20), and
    wherein the number of projections match the grooves positively.

4. The tooth replacement production device as claimed in claim 1,
    wherein the auxiliary element (22) in the area overlapping the tubular portion (18), comprises a wall thickness of 0.01 mm to 0.5 mm, which corresponds to an adhesive gap, and
    wherein the adhesive gap may be produced by burning out the auxiliary element.

5. The tooth replacement production device as claimed in claim 4,
    wherein the wall thickness is 0.01 mm to 0.06 mm.

6. The tooth replacement production device as claimed in claim 1,
    wherein the auxiliary element (22) is configured of a softer, more elastic material than both a dental material and the abutment (14).

7. The tooth replacement production device as claimed in claim 6,
    wherein the softer, more elastic material comprises a polymer that may be burnt out without leaving any residues.

8. The tooth replacement production device as claimed in claim 1,
    wherein the abutment (14) comprises a circumferential collar (16) which separates the implant connection and the tubular portion (18), and
    wherein the auxiliary element (22) ends at the collar (16), wherein a flange (42) extends beyond the collar (16) at the lower end of the auxiliary element (22).

9. The tooth replacement production device as claimed in claim 8,
    wherein the flange (42) extends beyond the collar (16) at the lower end of the auxiliary element (22) by 10 mm.

10. The tooth replacement production device as claimed in claim 1,
    wherein an adhesive bonding and modeling aid is provided which fits into the tubular portion (18) of the abutment (14) and also into the auxiliary element (22) and seals the inner side of the tubular portion (18) by providing a cone (34).

11. The tooth replacement production device as claimed in claim 10,
    wherein the adhesive bonding and modeling aid comprises a conical section which extends into the tubular portion (18) of the abutment (14) without a thread.

12. The tooth replacement production device as claimed in claim 1,
    wherein the tubular portion (18) of the abutment (14) ends with a front face (30) which abuts on an inner shoulder of the auxiliary element (22) when the auxiliary element (22) is applied.

13. The tooth replacement production device as claimed in claim 1,
    wherein the inside of the auxiliary element (22) extends flush with an inside of the tubular portion (18).

14. The tooth replacement production device as claimed in claim 1,
    wherein the auxiliary element (22) adheres to the tubular portion (18) non-positively and/or positively, wherein a holding force amounts to less than 10 kN and more than 50N.

15. The tooth replacement production device as claimed in claim 1,
wherein the auxiliary element (22) comprises a tube-shaped portion having a smaller external diameter and a tube-shaped holder portion (24) having a larger external diameter in contrast, and
wherein the tube-shaped portion comprises at least half of the length of the holder portion (24).

16. The tooth replacement production device as claimed in claim 1,
wherein the abutment (14) comprises a cone (34) at the tubular portion (18), having a cone angle of between 0.5° and 8°, and
wherein the auxiliary element (22) comprises a matching cone angle at a holder portion (24) and/or has been brought into the matching cone shape when the auxiliary element is pushed onto the tubular portion (18) of the abutment.

17. The tooth replacement production device as claimed in claim 1,
wherein the auxiliary element (22) may be shortened to a predefined extent consistent with the shortening of the tubular portion (18) of the abutment (14), and comprises corresponding marks.

18. The tooth replacement production device as claimed in claim 1,
wherein the anti-rotation mechanism is configured as a convex-shaped tongue and protrudes radially towards the inside thereof under formation of a convexity.

19. The tooth replacement production device as claimed in claim 1,
wherein the auxiliary element (22) comprises a reference surface and/or a scannable mark which position in space may be detected by a scanning device, which scanning device forms part of a CAD/CAM device.

20. A tooth replacement production device for producing a tooth replacement, said tooth replacement being produced using an abutment (14) of a tooth replacement, said abutment (14) comprising an implant connection, a collar (16) and a tubular portion (18) which is intended to be connected with a dental structure (12) of the tooth replacement,
wherein an auxiliary element (22) abuts on the tubular portion (18) and surrounds the tubular portion, and
wherein the auxiliary element (22) is configured of a material which can be removed without leaving any residues, and
wherein the auxiliary element (22) comprises greater roughness on a radial external surface than on a radial internal surface.

* * * * *